United States Patent
Rodriguez Valadez et al.

(10) Patent No.: US 9,262,396 B1
(45) Date of Patent: Feb. 16, 2016

(54) BROWSER COMPATIBILITY CHECKER TOOL

(75) Inventors: Pedro de Jesus Rodriguez Valadez, Seattle, WA (US); Maria Elisa Sanchez Careaga, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 729 days.

(21) Appl. No.: 12/732,473

(22) Filed: Mar. 26, 2010

(51) Int. Cl.
G06F 17/00 (2006.01)
G06F 17/27 (2006.01)
G06F 11/36 (2006.01)

(52) U.S. Cl.
CPC ........ *G06F 17/2725* (2013.01); *G06F 11/3684* (2013.01)

(58) Field of Classification Search
CPC ............ G06F 17/2247; G06F 11/3684; G06F 17/2725; G06T 7/001
USPC ............................ 715/234; 717/125, 134, 135
See application file for complete search history.

(56) References Cited

U.S. PATENT DOCUMENTS

| | | | |
|---|---|---|---|
| 6,223,190 B1 | 4/2001 | Aihara et al. | |
| 6,877,137 B1 | 4/2005 | Rivette et al. | |
| 7,171,483 B2 | 1/2007 | Klein | |
| 7,725,574 B2 | 5/2010 | O'Connell et al. | |
| RE41,440 E | 7/2010 | Briscoe et al. | |
| 8,103,692 B2 | 1/2012 | Kim et al. | |
| 8,719,703 B2 * | 5/2014 | Bier | 715/255 |
| 2002/0120506 A1 * | 8/2002 | Hagen | 705/14 |
| 2003/0061283 A1 * | 3/2003 | Dutta et al. | 709/204 |
| 2003/0234960 A1 * | 12/2003 | Kaltenbach et al. | 358/3.24 |
| 2005/0108299 A1 | 5/2005 | Nakajima | |
| 2005/0223363 A1 * | 10/2005 | Black-Ziegelbein et al. | 717/127 |
| 2006/0212803 A1 * | 9/2006 | Arokiaswamy | 715/520 |
| 2007/0234195 A1 | 10/2007 | Wells | |
| 2008/0162455 A1 * | 7/2008 | Daga et al. | 707/5 |
| 2008/0178043 A1 | 7/2008 | Xu | |
| 2008/0263193 A1 | 10/2008 | Chalemin et al. | |
| 2009/0183171 A1 | 7/2009 | Isaacs et al. | |
| 2009/0240654 A1 | 9/2009 | Limber et al. | |
| 2009/0249216 A1 * | 10/2009 | Charka et al. | 715/744 |
| 2009/0287791 A1 * | 11/2009 | Mackey | 709/209 |
| 2010/0175050 A1 | 7/2010 | Wang et al. | |
| 2010/0211893 A1 * | 8/2010 | Fanning et al. | 715/760 |
| 2010/0223280 A1 * | 9/2010 | Schneider | 707/769 |

(Continued)

OTHER PUBLICATIONS

Nathan, Using Litmus to integrate cross-browser testing into our workflow, Aug. 11, 2009, pp. 1-5. Retrieved: http://www.boost.co.nz/blog/design/cross-browser-testing/.*

(Continued)

*Primary Examiner* — Scott Baderman
*Assistant Examiner* — Howard Cortes
(74) *Attorney, Agent, or Firm* — Lee & Hayes, PLLC

(57) ABSTRACT

Browser compatibility checking of a web page source document is implemented on one or more servers. The browser compatibility checking of the web page source document involves receiving a request to render a web page source document for compatibility testing with different web browsers. The web page source document is then distributed to multiple rendering applications on a rendering server, in which each of the rendering application is to render the web page source document for one of the web browsers. The web page source document is then rendered at each of the rendering applications to generate rendered web page images.

40 Claims, 10 Drawing Sheets

(56) References Cited

U.S. PATENT DOCUMENTS

| | | | |
|---|---|---|---|
| 2011/0077892 A1 | 3/2011 | Emami et al. | |
| 2011/0093560 A1 | 4/2011 | Morris | |
| 2011/0093773 A1* | 4/2011 | Yee | 715/235 |
| 2011/0197121 A1* | 8/2011 | Kletter | 715/234 |
| 2011/0214163 A1 | 9/2011 | Smith et al. | |
| 2011/0296177 A1 | 12/2011 | Jamjoom et al. | |
| 2012/0173989 A1 | 7/2012 | Chen et al. | |
| 2012/0331406 A1 | 12/2012 | Baird et al. | |

OTHER PUBLICATIONS

Cody Lindley, JQuery Cookbook, Nov. 2009, O'Reilly, First Edition pp. 360-370.*
Erick Krock, Introduction to Cross-Browser, Cross-Platform, Backwardly Compatible JavaScript and Dynamic HTML, Dec. 14, 2000, pp. 1-10 Retrieved: http://www-archive.mozilla.org/docs/web-developer/xbdhtml/xbdhtml.html.*
Jacobs, Dynamic HTML, Jan. 24, 2009, pp. 1-5. Retrieved:https://web.archive.org/web/20090124234000/http://jqjacobs.net/web/dynamic.html.*
"Gomez Multi-Browser Performance Test," retrieved from <<http://www.gomez.com/multi-browser-performance-test/>>, available as early as Jul. 29, 2011, 1 pg.
"Gomez On-Demand-Automated-Cross-Browser-Testing," retrieved from <<http://www.gomez.com/wp-content/downloads/On-Demand-Automated-Cross-Browser-Testing.pdf>>, available at least as early as Mar. 14, 2011, pp. 1-6.
PerfectoMobile.com, retrieved from <<http://www.perfectomobile.com/portal/cms/index.html>>and available at least as early as Jul. 29, 2011, 1 pg.
Browsershots Website, retrieved on Feb. 9, 2010 at <<http://browsershots.org/>> Browsershots.org, 1 pg.
ImageMagick Website, retrieved on Feb. 9, 2010 at <<http://www.imagemagick.org/script/index.php>> ImageMagick Studio LLC, 3 pgs.
Non-Final Office Action for U.S. Appl. No. 13/194,610, mailed on Feb. 1, 2013, Pedro de Jesus Rodriguez Valadez et al., "Dynamic Browser Compatibility Checker", 42 pages.
Paganelli, et al., "Intelligent Analysis of User Interactions with Web Applications", IUI'02, Jan. 13-16, 2002, San Francisco, CA, ACM, 2002, pp. 111-118.
Office action for U.S. Appl. No. 13/194,610, mailed on Jul. 3, 2014, Rodriguez Valadez et al., "Dynamic Browser Compatibility Checker", 15 pages.
Office action for U.S. Appl. No. 13/194,610, mailed on Aug. 2, 2013, Pedro de Jesus Rodriguez Valdez, "Dynamic Browser Compatibility Checker", 44 pages.
Office action for U.S. Appl. No. 13/194,610, mailed on Feb. 20, 2014, Rodriguez Valadez, et al., "Dynamic Browser Compatibility Checker", 24 pages.

* cited by examiner

BROWSER COMPATIBILITY CHECKER TOOL

BACKGROUND

Web users may use different applications, such as web browsers, to view web content. However, web browsers may be developed for different operating systems and hardware platforms, or may be released by different browser developers for the same operating system platform. Moreover, a particular web browser may exist in several different versions as features are added or updated by browser developers.

As a result, web content providers spend considerable amounts of time and effort to ensure that their web pages display consistently across a broad set of commonly used web browsers, regardless of the version numbers and/or developers of the web browsers. Failure to properly test the rendering of web pages by a particular web browser may cause web content to be displayed incorrectly, web-based functions to fail to execute, or may result in a loss of valuable data. In instances where a web content provider depends on the web content to conduct commerce activities, the failure of a particular version of web browser to properly render a web page may result in loss of productivity, damage to business reputation or relations, or loss of potential sales or profits.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The disclosure is directed, in part, to the implementation of a browser compatibility checker tool that enables a web content developer to check whether production web pages are rendered consistently by different web browsers. However, other users, such as quality assurance (QA) engineers, software development managers, product managers, graphic designers, may also use the browser compatibility checker tool. As described and used herein, a browser or web browser includes any application configured to transform a source document that includes markup language-coded content, such as HyperText. Markup Language (HTML)-coded content, into an interactive document page. In some instances, the checks may be performed prior to releasing the production web pages for public or private use. The browser compatibility checker tool may enable a web content developer to perform batch compatibility tests of multiple web pages across many different web browsers. These different web browsers may include web browsers developed by different developers, web browsers developed for different operating systems or hardware platforms, and/or different versions of the same browser. Accordingly, the browser compatibility checker tool may assist web content developers in meeting testing and quality objectives in a more efficient manner, may shorten web page development cycles, and may also reduce the time burden associated with browser compatibility testing of web pages.

In some embodiments, the browser compatibility checking of a web page source document involves receiving a request to render the web page source document for compatibility testing with a plurality of web browsers. The web page source document is then distributed to multiple rendering applications on a rendering server, in which each of the rendering application is to render the web page source document for one of the web browsers. The web page source document is then rendered at each of the rendering applications to generate rendered web page images.

Illustrative System Architecture

Figure 1:
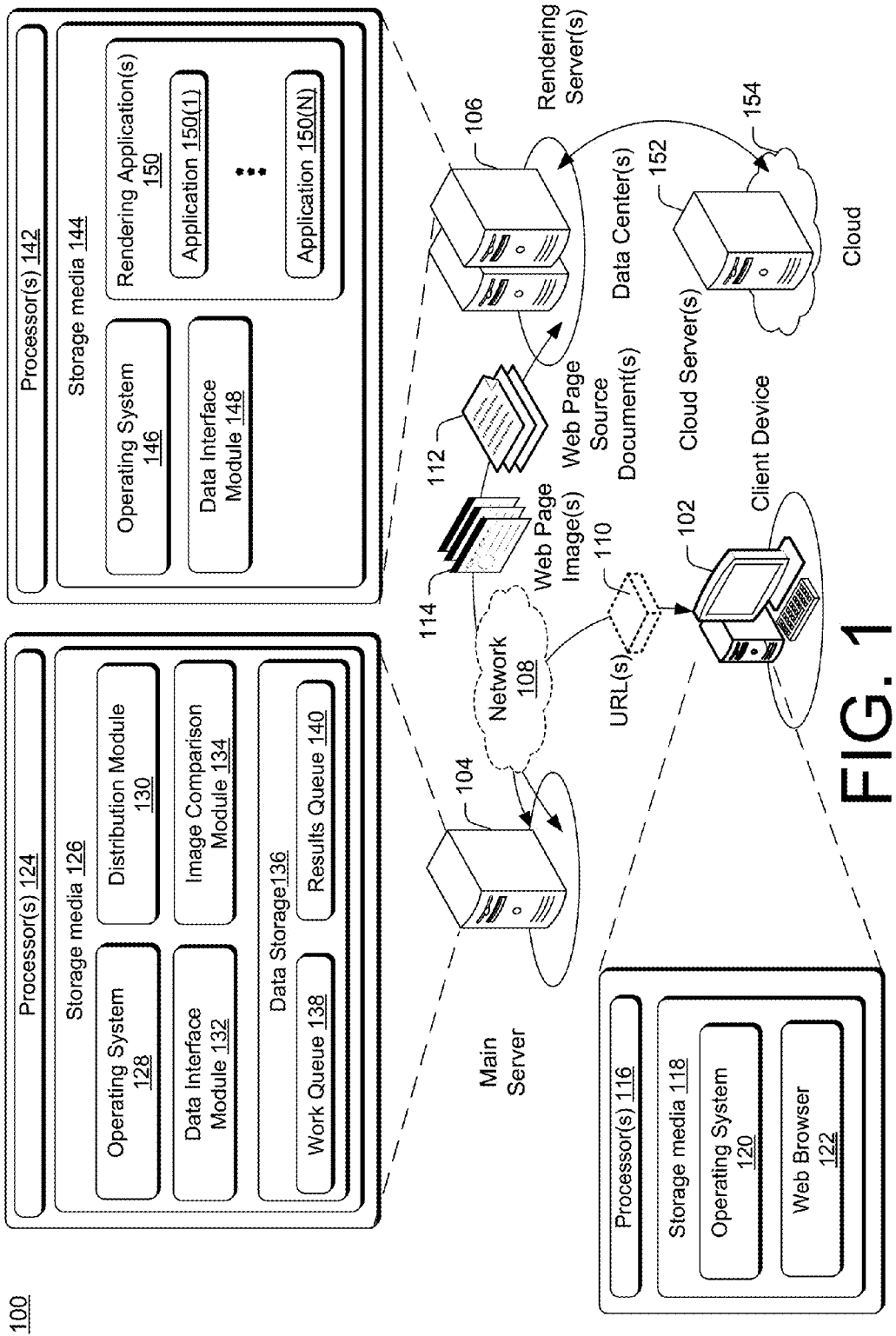
FIG. 1 shows an illustrative computing environment for implementing one or more embodiments of a browser compatibility checker tool.

FIG. 1 shows an illustrative computing environment 100 in which one or more embodiments of the browser compatibility checker tool may be implemented. The environment 100 may include one or more client devices 102, a main server 104, and multiple rendering servers 106 that are communicatively connected by a network 108. The one or more client devices 102 may include any electronic device that is capable of supporting the functionalities of a web browser. In various embodiments, each of the client devices 102 may be a laptop computer, a desktop computer, a tablet computer, a slate computer, a mobile phone, a personal digital assistant (PDA), and/or other electronic devices that are equipped with network communication components, data processing components, and electronic displays for displaying data.

The main server 104 may be located at a data center that is part of a content distribution network (CDN). Likewise, the rendering servers 106 may be locate in a single data center, or across multiple data centers. In some embodiments, the rendering servers 106 may be located in the same data center as the main server 104.

The network 108 may be a local area network ("LAN"), a larger network such as a wide area network ("WAN"), or a collection of networks, such as the Internet. Protocols for network communication, such as TCP/IP, may be used to implement the network 108. Although embodiments are described herein as using a network such as the Internet, other distribution techniques may be implemented.

As shown in FIG. 1, a web developer may use a client device 102 to send one or more universal resource locators (URLs) 110 that correspond to web page source documents 112 (e.g., HTML-formatted document or XHTML-formatted document) to the main server 104 via the network 108. The web page source documents 112 may be stored in the main server 104, or any other data server of the content distribution network.

The main server 104 may include a distribution component of the browser compatibility checker tool that is capable receiving the URLs 110 from the client devices 102, as well as distribute the URLs 110 to the rendering servers 106. The rendering servers 106 may include rendering components of the browser compatibility checker tool that automatically uses multiple web browsers to render the web pages associated with the URLs 110. For example, but not as a limitation, the web browsers may include various versions of the Internet Explorer® web browser, various versions of the Safari® web browser, various versions of the Firefox® 3 web browser, as well as other web browsers.

Following rendering, the rendered web page images 114 of the web page source documents 112 may be sent back to the main server 104. At the main server 104, the visual appearance of the rendered web page images 114 may be further inspected by an image analysis component of the browser compatibility checker tool. Such image analysis may determine whether the coding in the corresponding web page source documents 112 are compatible with the web browsers. In other words, the image analysis component may determine whether the web page source documents 112 can be properly displayed by the web browsers as the web developer intended. The results of such analysis may be presented back to the web developer at the client device 102.

Client Device

The client device 102 may include one or more processors 116, a storage media 118, and user controls that enable a user to interact with the device. User controls may include, but are not limited to, combinations of one or more of keypads, keyboards, mouse devices, touch screens, microphones, speech recognition packages, and any other suitable devices or other electronic/software selection methods. A plurality of modules may be stored in the storage media 118. The modules may include routines, programs, objects, components, and data structures that cause the each server 102 to perform particular tasks. In various embodiments, the modules may include an operating system 120 and a web browser 122.

The operating system 120 may include components that enable a client device 102 to receive data via various inputs (e.g., user controls, network interfaces, and/or memory devices), and process the data using the one or more processors 116 to generate output. The operating system 120 may include a display component that presents the output (e.g., display an image on an electronic display, store data in memory, transmit data to another electronic device, etc.). Additionally, the operating system 120 may include other components that perform various other functions generally associated with an operating system.

In various embodiments, the web developer may interact with the browser compatibility checker tool via the web browser 122 of the client device 102. For example, the web developer may use the web browser 122 to view one or more user interface pages that present the functionalities of the browser compatibility checker tool.

In some of these embodiments, each of the user interface pages may include HTML objects, script objects, Cascade Style Sheet (CSS) objects, image objects, and/or other static and/or dynamic objects (e.g., algorithms) that facilitate browser compatibility checking web page source documents. These objects may be downloaded from the main server 104 and assembled by the web browser 122.

Data Distribution Via the Main Server

The main server 104 may include one or more processors 124 and a storage media 126, which may store a plurality of modules. The modules may include routines, programs, objects, components, and data structures that cause the main server 104 to perform particular tasks. In various embodiments, the modules may include an operating system 128, a distribution module 130, a data interface module 132, an image comparison module 134, and data storage 136 that includes a work queue 138.

The operating system 128 may include components that enable the main server 104 to receive data via various inputs (e.g., user controls, network interfaces, and/or memory devices), and process the data using the one or more processors 124 to generate output. The operating system 128 may include a display component that presents the output (e.g., display an image on an electronic display, store data in memory, transmit data to another electronic device, etc.). Additionally, the operating system 128 may include other components that perform various other functions generally associated with an operating system.

The distribution module 130 of the main server 104 may receive a URL 110 of a web page source document 112, or a plurality of URLs 110 of corresponding web page source documents 112, from the client device 102 via a user interface page.

Figure 2:
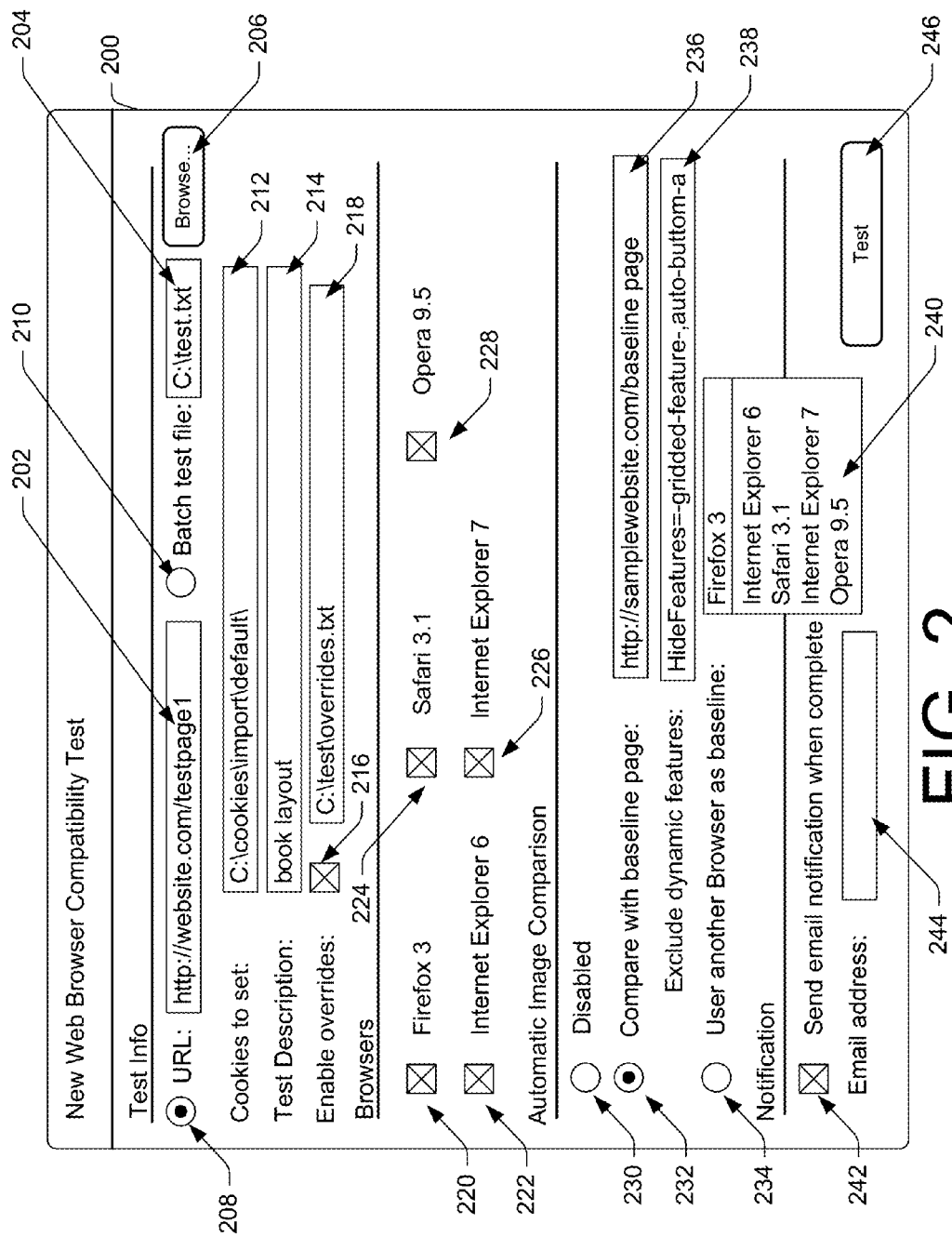
FIG. 2 shows an illustrative user interface page of a browser compatibility checker tool that implements browser compatibility checking.

FIG. 2 shows an illustrative user interface page 200 of a browser compatibility checker tool. The user interface page 200 is a data input page that may enable the web developer to provide the URLs of the web page source documents to be checked by the browser compatibility checker tool. The user interface page 200 may be generated by the distribution module 130.

As shown in FIG. 2, the user interface page 200 may include an address field 202 that enables the web developer to enter a URL 110 of a web page source document 112 to be tested for browser compatibility. The web page source document 112 may be stored in the main server 104. For example, as shown in FIG. 2, the web developer may enter the URL "http://www.website.com/testpage1" into the address field 202, where the URL corresponds to a web page source document 112 that is stored on the main server 104.

Additionally, the user interface page 200 may include a batch file field 204 and a browse button 206 that enable the web developer to upload a batch document (e.g., text document) that includes a plurality of URLs 110 of corresponding web page source documents 112. The web developer may enter the directory path to the batch document, or alternatively, use the browse button 206 to find the appropriate directory path to the batch document.

In at least one embodiment, the address field 202 and the batch file field 204 may be provided with radio buttons 208 and 210, respectively. The radio button 208 and 210 may enable the web developer to alternatively select one of the address field 202 or the batch file field 204 to receive input information.

The user interface page 200 may further include a cookie field 212 that enables to web developer to designate at least one cookie to be used during the processing of the one or more web page source documents 112. In various embodiments, the designated cookie may cause the rendering component of the browser compatibility checker tool to render the one or more web page source documents 112 in a specific way. For example, the cookie may activate or deactivate a certain feature or a particular web page portion coded in the one or more web page source document 112. Thus, with the use of the cookie field 212, the web developer may test the rendering of the web page source document 112 under different scenarios, in response to certain inputs, and/or specific modifications to the web page source documents 112.

The user interface page 200 may include a test description field 214 that enables the web developer to provide a description of the web browser compatibility test that is performed for web pages documents 112 that are associated with the URLs 110 entered into the address field 202 or the batch file field 204. For example, the web developer may provide the description "Book layout" in the test description field 214.

The web developer may use the override checkbox 216 of the user interface page 200 to activate (e.g., check) or deactivate (e.g., uncheck) overrides to default settings that the rendering component of the browser compatibility checker tool may use to render the web page source document 112. The default settings may be stored on the rendering servers 106. In various embodiments, the overrides may be CSS style overrides or JavaScript overrides. In such embodiments, the override checkbox 216 may be accompanied by a override entry field 218 that enables to web developer to enter directory path to the document (e.g., text document) where the override setting are located.

The user interface page 200 may also include checkboxes 220-228 that enables the web developer to select one or more web browsers. For instance, the web developer may select a web browser by checking the corresponding checkbox, and may deselect the web browser by unchecking the corresponding checkbox. Accordingly, browser compatibility testing for the one or more entered web page source documents 112 may be performed for the selected web browsers. For example, but not as a limitation, the web browsers for selection shown in FIG. 2 may include the Firefox® 3 web browser, the Internet Explorer® 6 web browser, the Internet Explorer® 7 web browser, the Safari® 3.1 web browser, and the Opera® 9.5 web browser. However, it will be appreciated that the user interface page 200 may provide checkboxes for other web browsers in other embodiments.

User options for the automatic analysis of rendered web page images 114, as produced for the purpose of browser compatibility testing, may be provided on the user interface page 200. Such user options may include a set of radio buttons 230-234. The radio button 230 may enable the web developer to disable the image analysis component of the browser compatibility checker tool. For example, the web developer may wish to do so if the web developer desires to manually inspect the rendered web page images to determine whether the web page source documents 112 are rendered correctly by each selected web browser.

The radio button 232 may cause the image analysis component to compare one or more rendered web page images 114 to a baseline web page image, in which the one or more rendered web page images 114 and the baseline web page are rendered based on the same web page source document 112. The baseline web page image may be a model image of a web page that is considered to be properly configured for web browser display. Accordingly, in some embodiments, the radio button 234 may be accompanied by a baseline input field 236 that enables the web developer to enter the URL or the file directory path of the baseline web page image.

However, in embodiments where the web developer has submitted multiple URLs 110 via the batch file field 204, the distribution module 130 may adjust or replace the baseline input field 236 with multiple baseline input fields. In such embodiments, the distribution module 130 determine the URLs 110 that were in a batch file submitted via the batch file field 204, and provide baseline input fields for submitting baseline web pages. The distribution module 130 may providing the corresponding multiple baseline input fields by refreshing the user interface page 200 after the number of URLs 110 in the batch file is determined, or by providing a new user interface page that includes the correspond number of multiple baseline input fields. For example, the web developer may submit a batch file that includes two URLs to be tested: "http://travelpage.com" and "http://mainpage.com". Accordingly, the distribution module 130 may either modify the user interface page 200 or provide a new user interface page that includes two corresponding baseline input fields, so that the web developer may submit a baseline web page image for each URL to be tested.

The radio button 232 may be further accompanied by a feature exclusion field 238. The web developer may use the feature exclusion field 238 to designate one or more code portions of each web page source document 112 that are to be excluded from being rendered. For example, the_excluded code portions may code for dynamic web content (e.g., advertisements, headline banners, tickers, etc.) that may change each time a web page image is rendered. Accordingly, the feature exclusion field 238 may enable the web developer to enter parameters (e.g., position and dimension data) that prevent the rendering components of the web browser compatibility checker tool from rendering one or more code portions of each web page source document for which a URL 110 is entered into the address field 202 or the batch file field 204.

The radio button 234 may cause the image analysis component of the browser compatibility checker tool to compare multiple rendered web page images 114 that are based on the same web page source document 112 by using one of the rendered web page images 114 as a baseline. The web developer may do so by using the pull down menu 240, which may contain a list of web browsers from which a baseline web page image may be chosen. For example, the web developer may tailor the coding in a particular web page source document 112 so that the resultant web page image may look ideal to the developer when rendered by a particular web browser (e.g., Firefox® 3). Accordingly, the web developer may wish to inspect the rendering ability of other web browsers with respect to the particular web page source document 112.

Thus, in such a scenario, the web developer may use the pull down menu 240 to select Firefox® 3 as the baseline browser. In this way, the image analysis component may regard the rendered web page image of a particular web page source document 112 generated by Firefox® 3 as the baseline web page image. The image analysis component may then compare all other web page images for the particular web page source document 112, as rendered by other web browsers, to the Firefox® 3 baseline web page image. In various embodiments, the radio buttons 230-234 may be configured in such a way that only one of the radio buttons may be select at any given time.

In some embodiments, the user interface page 200 may further include an email notification checkbox 242 that the web developer may activate (e.g., check) or deactivate (e.g., uncheck). The activation of the checkbox 242 may cause the browser compatibility checker tool to send a notification (e.g., via email, a text message, etc.) to the web developer after the web browser compatibility tool has performed the rendering and/or image analysis for the web page source documents 112. As such, the email notification checkbox 242 may be accompanied by an email address field 244 in which the web developer may enter an email address.

As further shown in FIG. 2, once the web developer has entered the test information for the testing of at least one web page source document 112 on the one or more web browsers, the user may activate (e.g., click) the test button 246 to upload the information to the main server 104 via the web browser 122.

It will be appreciated that while the user interface page 200 is described above as being provided with interface elements such as radio button, pull down menus, and checkbox, such interface elements may be substituted with other interface elements in alternative embodiments.

Figure 3:
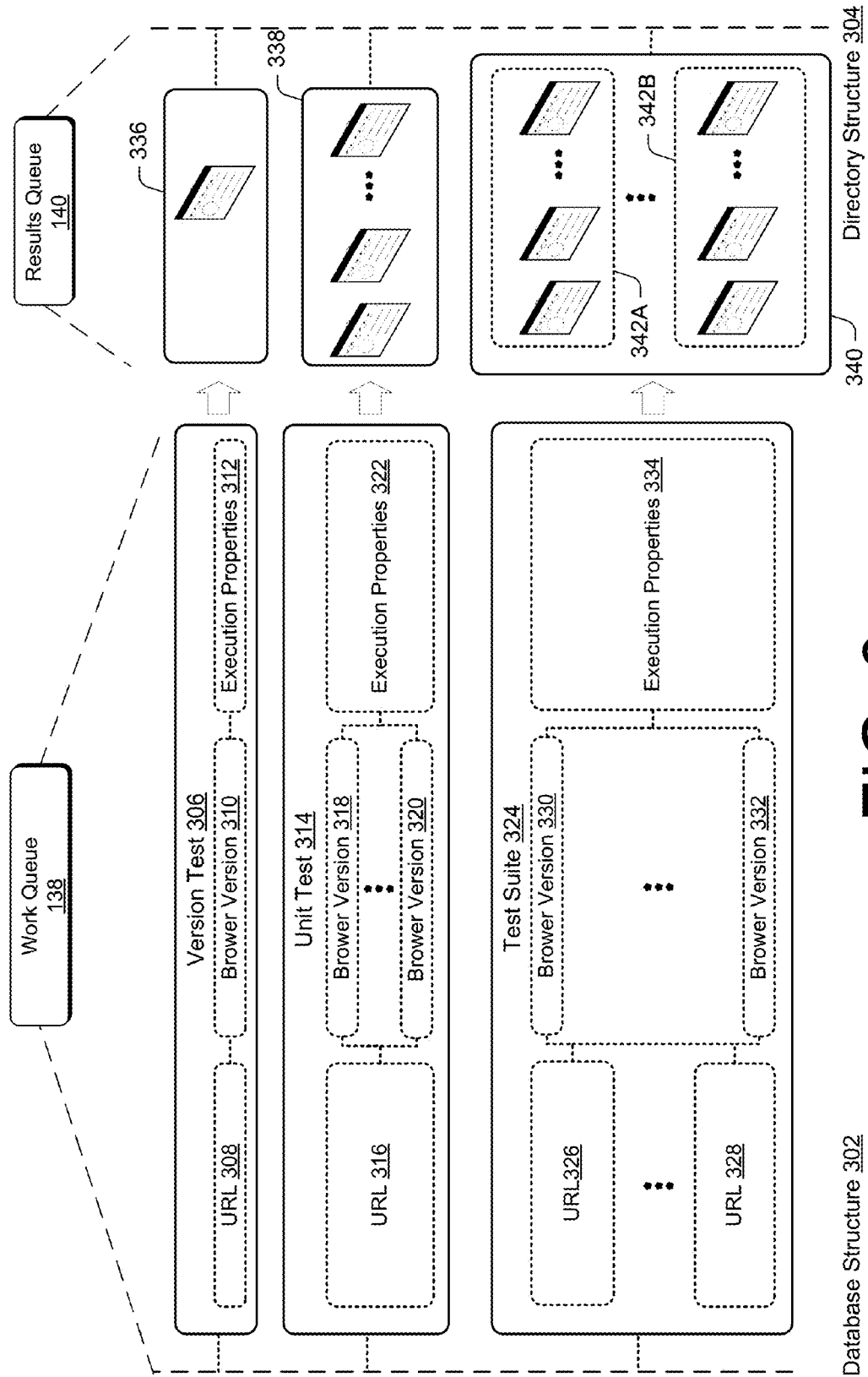
FIG. 3 shows an illustrative data structure of a work queue that stores web browser compatibility test information, as well as a file directory structure of a results queue that stores compatibility test results.

FIG. 3 shows an illustrative data structure 302 of the work queue 138 that stores web browser compatibility test information, as well as a file directory structure 304 of the results queue 140 that stores compatibility test results. In various embodiments, the data structure 302 may be implemented via database language such as Structured Query Language (SQL), Query by Example (QBE), XQuery, and the like. As shown, the distribution module 130 may use a data structure 302 to store compatibility test information. Specifically the distribution module 130 may use a data node 306 of the data structure 302, referred to as a "version test", to store the information for the testing of each single URL on a single web browser. In other words, as shown in FIG. 3, the "version test" node 306 may store a URL 308 of a corresponding web page source document 112, the web browser version 310 for which compatibility testing is to be performed, as well as the test execution properties 312 for performing the browser compatibility test. As used herein, "execution properties" may include one or more cookies, one or more overrides to be applied during the rendering, test description, and/or code portions of each web page source document to be excluded from rendering. As further used herein, "browser version" may refer to a particular browser released by a browser developer, and/or a specific version of the particular browser. In at least one embodiment, the distribution module 130 may parse a request to perform compatibility of multiple URLs with a single browser version to a corresponding plurality of version tests.

The distribution module 130 may further use a data node 314, referred to as a "unit test", to store the information for the testing of a single URL on multiple web browsers. In other words, as shown in FIG. 3, the "unit test" node 314 may store a URL 316 of a corresponding web page source document 112, as well as multiple browser versions for which compatibility testing is to be performed. For example, the multiple browser versions may include browser versions 318 and 320. In such an example, the data node 314 may also store execution properties 322 for the testing of the browser versions 318 and 320.

The distribution module 130 may also use a data node 324, referred to as "test suite", to store information for the testing of multiple URLs (multiple web page source documents 112) on multiple web browsers. For each URL in the "test suite", the data node 324 may store the multiple browser versions for which compatibility testing is to be performed. For example, the distribution module 130 may associate browser versions 330 and 332 with each of a URL 326 and a URL 328 in the data node 324. Moreover, the data node 324 may also store execution properties 334 for all the URLs (e.g., URLs 326 and 328) that are in the data node 324, so that identical web browser compatibility tests may be performed for the web page source documents associated with the URLs.

During that actual performance of the web browser compatibility tests, the distribution module 130 may convert each stored unit test (e.g., unit test 314) and each stored test suite (e.g., test suite 324) into multiple corresponding version tests 302 prior to sending them to a rendering server 106 using the data interface module 132. It will be appreciated that such conversions may be due to the fact that each of the rendering servers 106 is configured to process version tests, rather than unit tests and test suites. In an example conversion, the distribution module 130 may convert the unit test 310 into a first version test that includes the URL 316, the browser version 318, and the execution properties 322, and a second version test that includes the URL 316, the browser version 320, and the execution properties 322. In at least one embodiment, the data interface module 132 may use protocols such as plain Hypertext Transfer Protocol (HTTP), Java Remote Method Invocation (RMI), etc. to exchange data with each rendering server 106. Moreover, the data interface module 132 may also use scripting languages such as JavaScript, XML, etc., to communicate with the web page rendering applications 150 on the each rendering server 106.

In some embodiments, the work queue 138 and/or results queue 140 may reside on one or more cloud servers 152 that is part of a computing cloud 154, rather than on the main server 104. The cloud servers 152 of the computing cloud 154 may provide computing resources, as well as data storage and retrieval capabilities. In such embodiments, the main server 104 may act as an intermediary that passes the URL 110 of a rendering request to the work queue 138 that is on the cloud servers 152. Additionally or alternatively, the main server 104 may retrieve the rendered page images for the web page source document 112 from the cloud servers 152 for image comparison.

Accordingly, the distribution module 130 of the main server 104 may associate web developers with corresponding submitted URLs 110 and the resultant web page images. Moreover, each of the rendering servers 106 may pass rendered web page images to the cloud servers 152. In at least one embodiment, a web developer may supply the distribution module 130 with an authentication credential (e.g., user name, password, digital certificate, biometric information, and/or the like) when submitting one or more URLs 110 to be rendered. The submitted authentication credential, and it relationship to the version test, unit test, or test suite to be performed for the one or more URLS 110 may be stored in the data storage module 136. Alternatively, the submitted authentication credentials may be stored as associated metadata for each of the version test, unit test, or test suite, and then converted into metadata that are associated with the rendered web page images stored in the directory structure 304. Subsequently, the web developer may submit authentication credential to be verified by the distribution module 130 when the web developer desires to access the rendered web images. In turn, the distribution module 130 may access and compare the stored authentication credential to the newly submitted authentication credential. The distribution module 130 may further retrieve the web page images from the cloud servers 152 via the data interface module 132 for image comparison or display when the authentication credentials match. Otherwise, the web developer is denied access to the rendered web page images.

Rendering Server

Returning to FIG. 1, a rendering server 106 may include one or more processors 142 and a storage media 144, which may store a plurality of modules. The modules may include routines, programs, objects, components, and data structures that cause the each server 102 to perform particular tasks. In various embodiments, the modules may include an operating system 146, a data interface module 148, and one or more rendering applications 150.

The operating system 146 may include components that enable the main server 104 to receive data via various inputs (e.g., user controls, network interfaces, and/or memory devices), and process the data using the one or more processors 142 to generate output. The operating system 146 may include a display component that presents the output (e.g., display an image on an electronic display, store data in memory, transmit data to another electronic device, etc.). Additionally, the operating system 146 may include other components that perform various other functions generally associated with an operating system.

The data interface module 148 may enable the rendering server 106 to receive version tests from the main server 104 and pass each version test to an appropriate rendering application 150. In various embodiments, the data interface module 148 may use protocols such as Hypertext Transfer Protocol (HTTP), Java Remote Method Invocation (RMI), etc., to exchange data with the main server 104. Moreover, the data interface module 132 may also use scripting languages such as JavaScript, XML, etc., to pass the rendered web page images back to the main server 104.

Each of the rendering applications 150 may be configured carry out the rendering of web page source documents 112, as directed by corresponding URLs 110, for a particular web browser. For example, the rendering application 150(1) may include a rendering engine that renders web page source documents 112 in the same manner as the web browser Firefox® 3. Similarly, the rendering application 150(N) may include a rendering engine that renders web page source documents 112 in the same manner as the web browser Internet Explorer® 7. Other rendering applications 150 may include rendering engines that respectively render web page source documents 112 in the same as other web browsers, such as Safari® 3.1, Opera® 9.5, and the like.

The rendering applications 150 for different web browsers may be distributed across multiple rendering servers 106. For example, the rendering applications for the Internet Explorer® 7 web browser and the Opera® 9.5 web browser may be installed on a first rendering server of a data center, while the rendering applications for the Internet Explorer® 6 web browser, Firebox®, and Safari® 3.1 web browser may be installed on a second rendering server.

Accordingly, the distribution module 130 of the main server 104 may allocate version tests to each of the rendering applications 150 by matching the browser version described in each version test to the render capability of each rendering application 150. For example, the distribution module 130 may allocate a version test that names Firefox® 3 to the rendering application 150(1), and allocate another version test that names Internet Explorer® 7 to the rendering application 150(N). In at least one embodiment, the rendering capability of each rendering application 150 may be provided to the distribution module 130 in advance, and such metadata may also be stored in the data storage 136. Alternatively, the distribution module 130 may have the ability to communication with each rendering application 150 to determine the rendering capability of the application prior to sending the appropriate version test.

In various embodiments, the distribution module 130 may release a version test to a particular rendering application 150 from the work queue 138 once the distribution module 130 has detected that the particular application 150 is available, i.e., not processing another version test. In this way, the distribution module 130 may ensure that version tests are efficiently processed based on the availability of each rendering application 150.

In other embodiments, multiple instances of the same rendering application 150 may be executed on the same rendering server 106 or on a plurality of rendering servers 106. For example, web developers may be more interested in testing the compatibility of web page source documents 112 for Internet Explorer® than Opera® 3.1. Accordingly, a rendering server 106 may be configured to execute multiple instances of a rendering application 150 that renders for Internet Explorer® 7, while only executing a single instance of a rendering application 150 that renders for Opera® 9.5. Similarly, two rendering servers 106 may both execute rendering applications that render for Internet Explorer® 7.

Accordingly, in various embodiments, the distribution module 130 may have the ability to cause the one or more rendering servers 106 to initiate or terminate one or more instances of each rendering application 150 depending on the nature of the version tests in its work queue 138. For example, the distribution module 130 may cause a rendering server 106 to initiate another instance of an Internet Explorer® 7 rendering application when the numbers of version tests for testing Internet Explorer® 7 browser compatibility exceeds a predetermined threshold. Such an instance of the rendering application may be instantiated on a rendering server 106 that is less busy (e.g., more CPU idle time) than the resting of the rendering servers. In this way, the distribution module 130 may load balance the rendering of web page images for browser compatibility testing between multiple rendering servers 106.

Image Comparison on the Main Server

Subsequent to the generation of web page image for each of the version tests by the one or more rendering servers 106, the distribution module 130 of the main server 104 may receive the web page images via the data interface module 132. Accordingly, the distribution module 130 may store the web page image in the results queue 140 according to the original version test, unit test, and test suite structures, regardless of the order in which the web page images are received from the one or more rendering servers 106. Thus, the file directory structure 304 of the results queue 140 may include directory folders that parallel the node organization of the data structure 302.

For example, as shown in FIG. 3, the web page image generated for the URL 308 of the version test 306 may be stored in a file folder 336 of the directory structure 304. Likewise, the web page images generated for the URL 316 of the unit test 314 may be stored in a file folder 338 of the directory structure 304. Moreover, the distribution module 130 may create a file folder 340 to store the web page images rendered for the URLs 326 and 328. The file folder 340 may include a subfolder 342A that stores the web page images generated for the URL 326, and a subfolder 324B that stores the web page images rendered for the URL 328.

The distribution module 130 may trigger the image comparison module 134 to analyze for a visual difference between each of the web page images and a baseline image that are rendered for each URL. As described above, the baseline image may be set via the radio button 232 or the radio button 234 of the user interface page 200. In various embodiments, the image comparison module 134 may generate a numerical difference score for each rendered web page image that represents this visual difference. The image comparison module 134 may generate such numerical difference scores so that a lower score represents smaller visual difference between two images, and a higher score represents more visual difference between two images.

Following each numerical difference score generation, the image comparison module 134 may further use preset score ranges to determine whether each rendered web page image is a visually acceptable representation of the baseline image (hence a visually acceptable representation of the web page source document). In the embodiments described above, the image comparison module 134 may assign one of a "pass" status, "low pass" status, or "fail" status to a rendered web page image. The image comparison module 134 may assign a "pass" status to a rendered web page image when its numerical difference score is lower or equal to a first threshold (e.g. a score between the range of 0-10), in which the "pass" status may indicate that there is no or virtually no visual difference between the rendered web page image and the baseline web page image. In other words, a web browser for which the rendered web page image is generated is likely to correctly interpret and format the underlying web page source document.

A "low pass" status may be assigned by the image comparison module 134 to a rendered image when its numerical difference score is higher than first threshold but lower than or equal to a second threshold (e.g., a score between the range of 10-50). The "low pass" status may indicate that there is some visual difference between the rendered web page image and the baseline web page image. However, the visual differences are minute and are within an acceptable limit. In other words, a web browser for which the rendered web page image is generated is likely to perform a slightly deviated interpretation of the underlying web page source document. Nevertheless, the deviation is within acceptable limits for the developer. Because different developers and different contexts may call for different tolerances, the first and/or second thresholds may be user configurable in some instances.

In contrast to the above, the image comparison module 134 may assign a "fail" status to a rendered web page image when its numerical difference score is higher than the second threshold. The "fail" status may indicate that there is an unacceptable amount of visual disparity between the rendered web page image and the baseline web page. In other words, a web browser for which the rendered web page image is generated is unlikely to correctly interpret and format the underlying web page source document.

The image comparison module 134 may store information regarding the visual differences, as well as the visual acceptance status of the web page images, in the data storage 136. Alternatively or concurrently, the image comparison module 134 may further encode such information as metadata in each rendered web page image.

The decision by the distribution module 130 to trigger the image comparison module 134 may be dependent on selection made by the web developer via the radio buttons 230-234 of the user interface page 200. Once the distribution module 130 and/or the image comparison module 134 have performed the appropriate operations, the distribution module 130 may further notify the corresponding web developer. In various embodiments, the notification may be sent to the email address that is provided via the email address field 244 of the illustrative user interface page 200. In response, the web developer may use the web browser on the client device 102 to navigate to a summary web page to view the rendered web page images.

Figure 4:
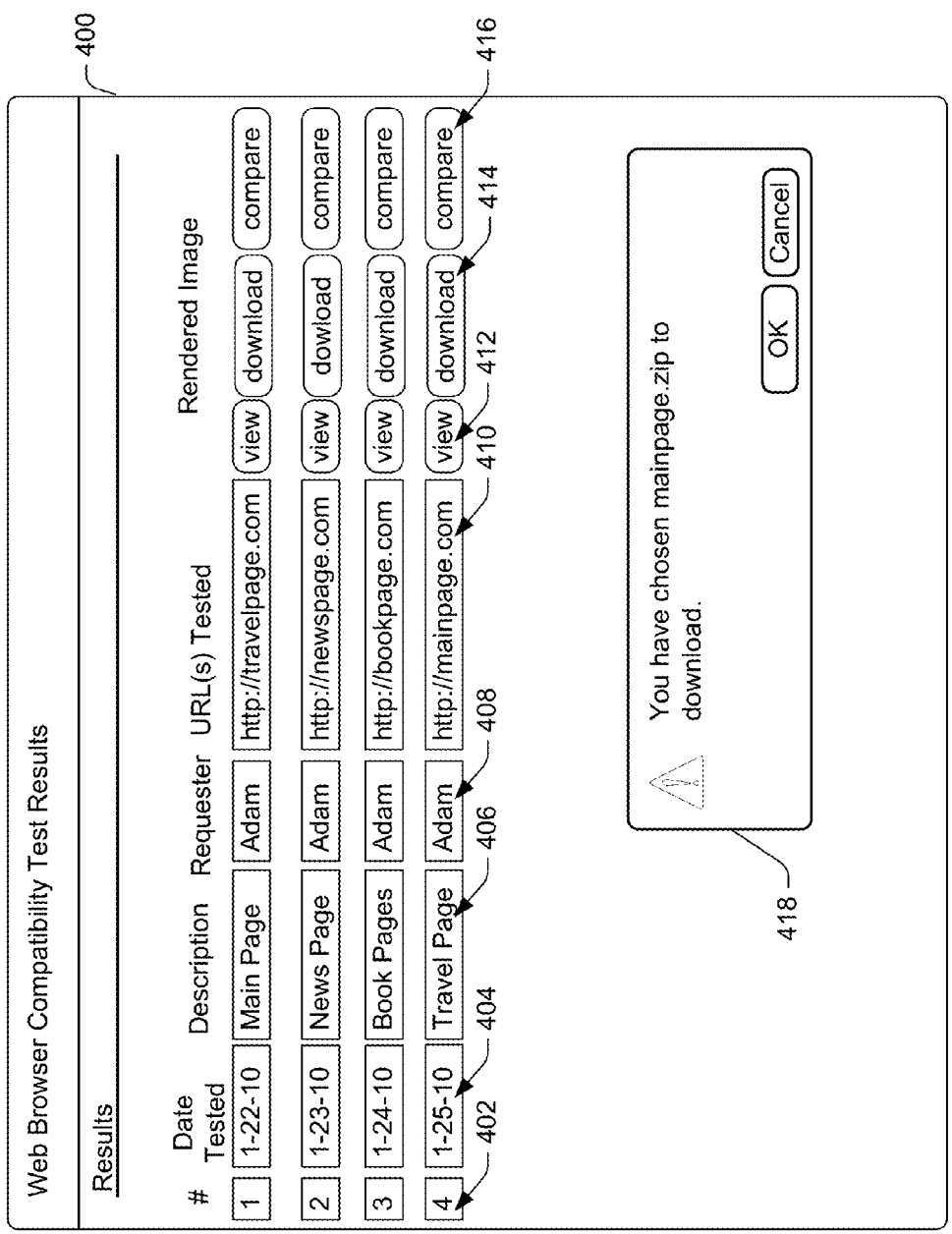
FIG. 4 shows an illustrative user interface page of a browser compatibility checker tool that displays a summary of the web browser compatibility results.

FIG. 4 shows an illustrative user interface page 400 of the browser compatibility checker tool that displays a summary of the web browser compatibility results. The user interface page 400 may be generated by the distribution module 130. The web developer may access the user interface page 400 after receiving notification that a particular browser compatibility check is complete. In some embodiments, the user interface page 400 may be displayed to a particular web developer after the web developer has authenticated to the browser compatibility checker tool (e.g., provided the correct login information).

The user interface page 400 may show each of the one or more browser compatibility check tests that the web user performed. In at least one embodiment, the user interface page 400 may show relevant information for each browser compatibility check test. The relevant information may include a reference number of the test (e.g., reference number 402), the date the test was performed, (e.g., date information 404), and the description of the web page source document 112 that was tested (e.g., description 406). The relevant information may further include the name of the web developer who requested the test (e.g., requester name 406), the one or more URLs that correspond to the web page source document 112 that was tested (e.g., URL 410), a view button (e.g., view button 412), a download button (e.g., download button 414), and a compare button (e.g., compare button 416).

The activation (e.g., click) of a view button, such as the view button 412, may cause the distribution module 130 to generate another user interface page that displays the rendered web page images. For example, when a web developer has elected to perform web browser compatibility testing of a particular web page source document 112 for three different versions of web browsers, the generated user interface page may display three corresponding rendered web page images for each of the web browser versions. Thus, the web developer may visually inspect each of the rendered web page images to determine whether the coding in the particular web page source document 112 is compatible with the web browser versions. In some embodiments, the generated user interface page may include a plurality of thumbnail images that the web page developer may individually select (e.g., click) to view corresponding rendered web page images.

The activation (e.g., click) of a download button, such as the download button 414, may cause the distribution module 130 to provide one or more user interface prompts that enable the web developer to download the rendered images for the corresponding web browser compatibility test. For example, the activation of the download button 414 may cause the distribution module 130 to display a user interface prompt 418 to indicate that the web developer has elected to download rendered web page images of the web browser compatibility check test No. 4. In various embodiments, the one or more user interface prompts may also enable the user to select a networked location on a client device (e.g., a directory location on the client device 102) where the rendered web page images are to be stored, whether the web page images are to be compressed, password protected, encrypted, and the like.

The activation (e.g., click) of a compare button for a particular web browser compatibility test, such as the compare button 416, may cause the image comparison module 134 to display image comparison for the rendered web page images of the particular compatibility test. However, in an instance where the web developer had previously elected to not perform automatic image comparison via the radio button 230 of the user interface page 200 (FIG. 2), the distribution module 130 may make the corresponding compare button unavailable on the user interface page 400 (e.g., the corresponding compare button may be grayed out).

Figure 5:
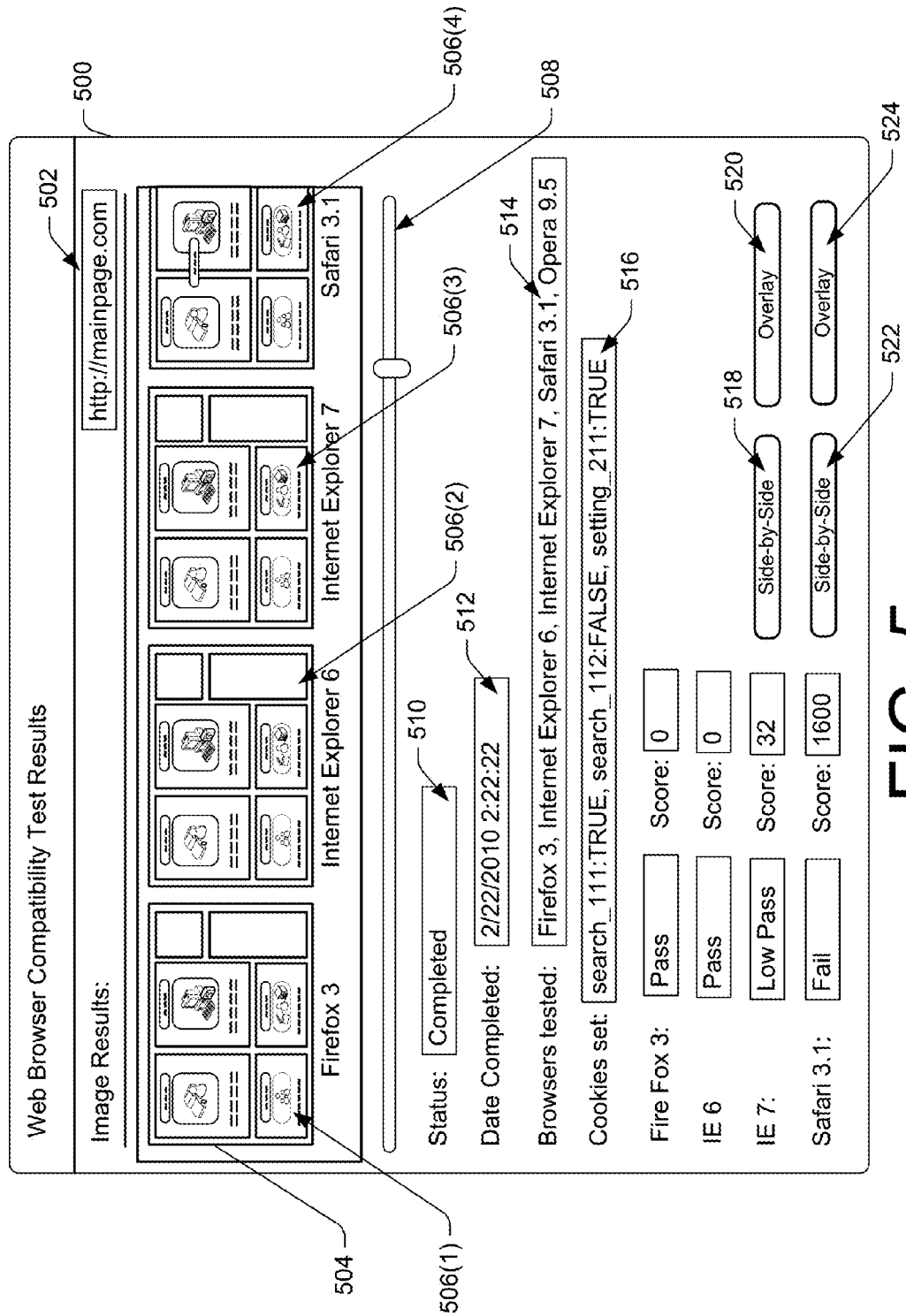
FIG. 5 shows an illustrative user interface page of a browser compatibility checker tool that displays comparative web browser compatibility results for a web page source document associated with a particular universal resource location (URL).

FIG. 5 shows an illustrative user interface page 500 of the browser compatibility checker tool that displays comparative web browser compatibility results for web page source document associated with a particular universal resource location (URL). The user interface page 500 may be generated and displayed for a particular web browser compatibility test by the image comparison module 134 when the user activate a compare button (e.g., compare button 416), that is displayed on the user interface page 400. The user interface page 500 may include a URL portion 502 that displays the particular URL (e.g., URL 410) for which the web page images were rendered. The user interface page 500 may further include an image display portion 504 that displays one or more selectable icons, e.g., selectable icons 506(1)-506(4), that represent corresponding rendered web page images. In at least one embodiment, each of the one or more selectable icons may be thumbnail images. The activation (e.g., click) of each of the selectable icons 506(1)-406(4) may trigger the display of a corresponding larger rendered web page image. The image display portion may further include one or more navigation control 508 (e.g., horizontal and/or vertical scroll bars) that enables the web developer to scroll and view all of the rendered images.

The user interface page 500 may include additional portions that display relevant information regarding the web browser compatibility test for the particular URL. Such portions may include a status display portion 510 that indicates the status of the web browser compatibility test. For example, the status display portion 510 may indicate the status as one of "completed," "aborted," "error," and the like. Likewise, if the web browser compatibility test was successfully completed, the date and time of completion may be displayed in a completion date portion 512 of the user interface portion 500.

The additional portions may further include a browser tested portion 514 and a set cookie portion 516. The browser tested portion 514 may indicate the web browsers that were tested for compatibility with the web page source document 1122 associated with the particular URL (e.g., URL 410). The set cookie portion 516 may indicate the one or more cookies that were used during the testing of the associated web page source document.

The user interface page 500 may further display a status that indicates whether each of the web browsers tested in a browser compatibility test may properly render a web page source document 112 (e.g., the web page source document associated with the URL 410). For example, as shown in the user interface page 500, the tested web browsers Firefox® 3 and Internet Explorer® 6 may each have a status of "pass", with a corresponding numerical difference score to a baseline web page image of "0". The tested web browser Internet Explorer® 7 may have a status of "low pass", with a corresponding numerical difference score to a baseline web page image of "32". In contrast, the tested web browser Safari® 3.1 may have a status of "fail", with a corresponding numerical difference score to a baseline web page image of "1600".

Further, in some embodiments, the image comparison module 134 may configure the user interface page 500 to include selectable image viewing buttons for each test web browser whose status is something other than "pass". In the above example, the tested web browser Internet Explorer® 7 may be provided with a side-by-side image comparison button 518, and an overlay image comparison button 520. Likewise, the tested web browser Safari 3.1 may be provided with a side-by-side image comparison button 522, and an overlay image comparison button 524. The operations of such image comparison buttons are described in FIG. 6 and FIG. 7.

Figure 6:
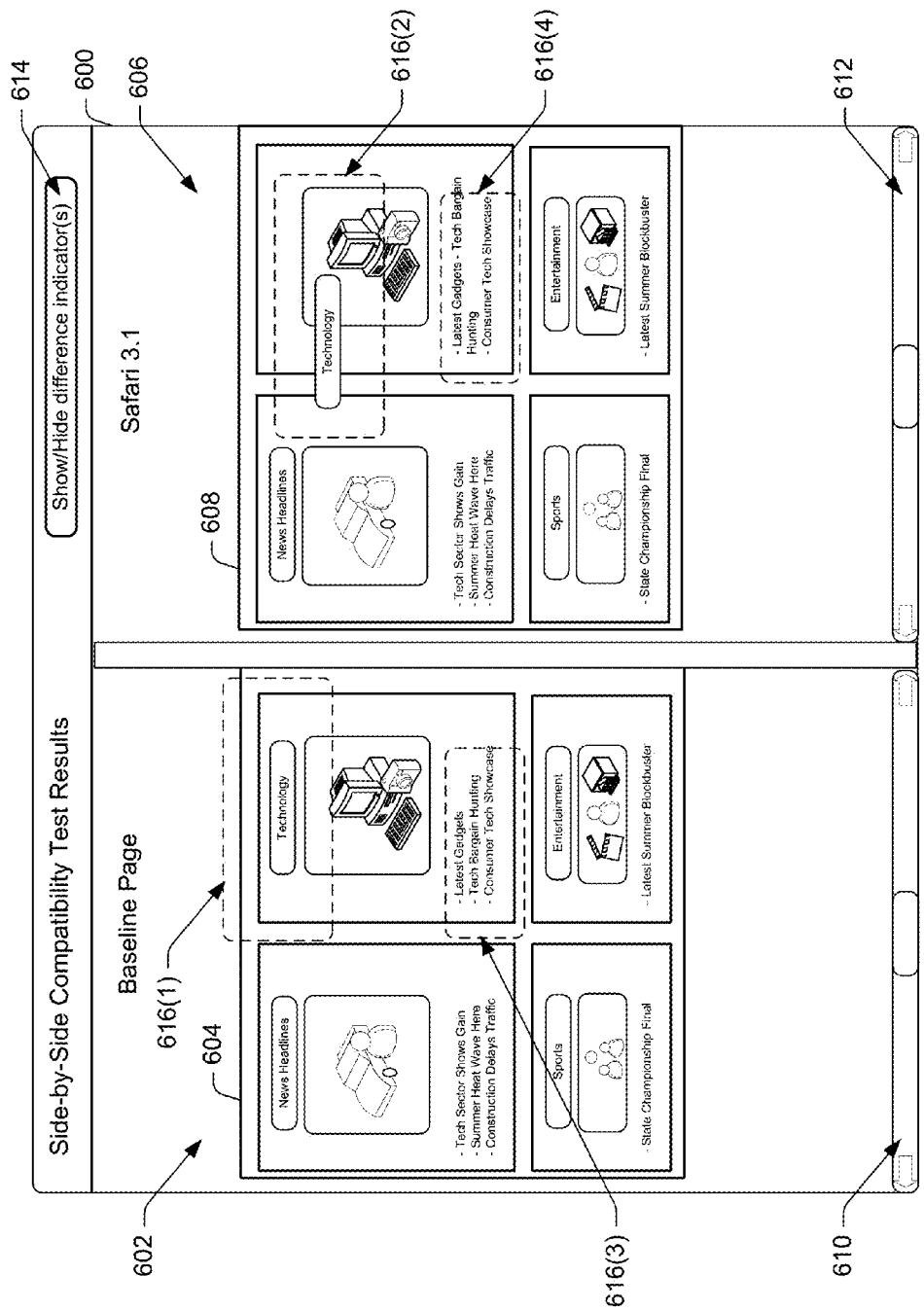
FIG. 6 shows an illustrative user interface page of a browser compatibility checker tool that displays side-by-side web page images as generated for multiple web browsers.

FIG. 6 shows an illustrative user interface page 600 of the browser compatibility checker tool that displays side-by-side web page images for visual comparison. The web developer may access the user interface page 600 by selecting (e.g., clicking) a side-by-side image comparison button, such as the comparison button 522 described in FIG. 5. In various embodiments, the user interface page 600 may be generated by the image comparison module 134 of the main server 104.

The use interface page 600 may include a first display portion 602 that shows a baseline web page image 604, and a second display portion 606 that shows a rendered web page image 608. Each of the display portions 602 and 606 may also include one or more navigation control (e.g., horizontal and/or vertical scroll bars) that enables the web developer to scroll and view all of the rendered images. As shown, the display portion 602 may include a navigation control 610, and the display portion 606 may include a navigation control 612.

The user interface page 600 may display visual indicators that emphasize the visual difference between the baseline web page image 604 and the rendered web page 608. The image comparison module 134 may cause the user interface page 600 to display the visual indicators when the user activates (e.g., clicks) the toggle button 614. In at least one embodiment, the visual indicator may be in the form of superimposed rectangular outlines, such as the visual indicators 616(1)-616(4), that indicate the visual difference between the images 604 and 608. However, the visual indicators may also take other forms in other embodiments, such as colored highlights, arrow symbols, and/or the like. Accordingly, the displayed visual indicators may aid the web developer in recognizing the visual differences between the web page images 604 and 608. A subsequent activation (e.g., click) of the toggle button 614 may cause the image comparison module 134 to hide the visual indicators, such as the visual indicators 616(1)-616(4).

Figure 7:
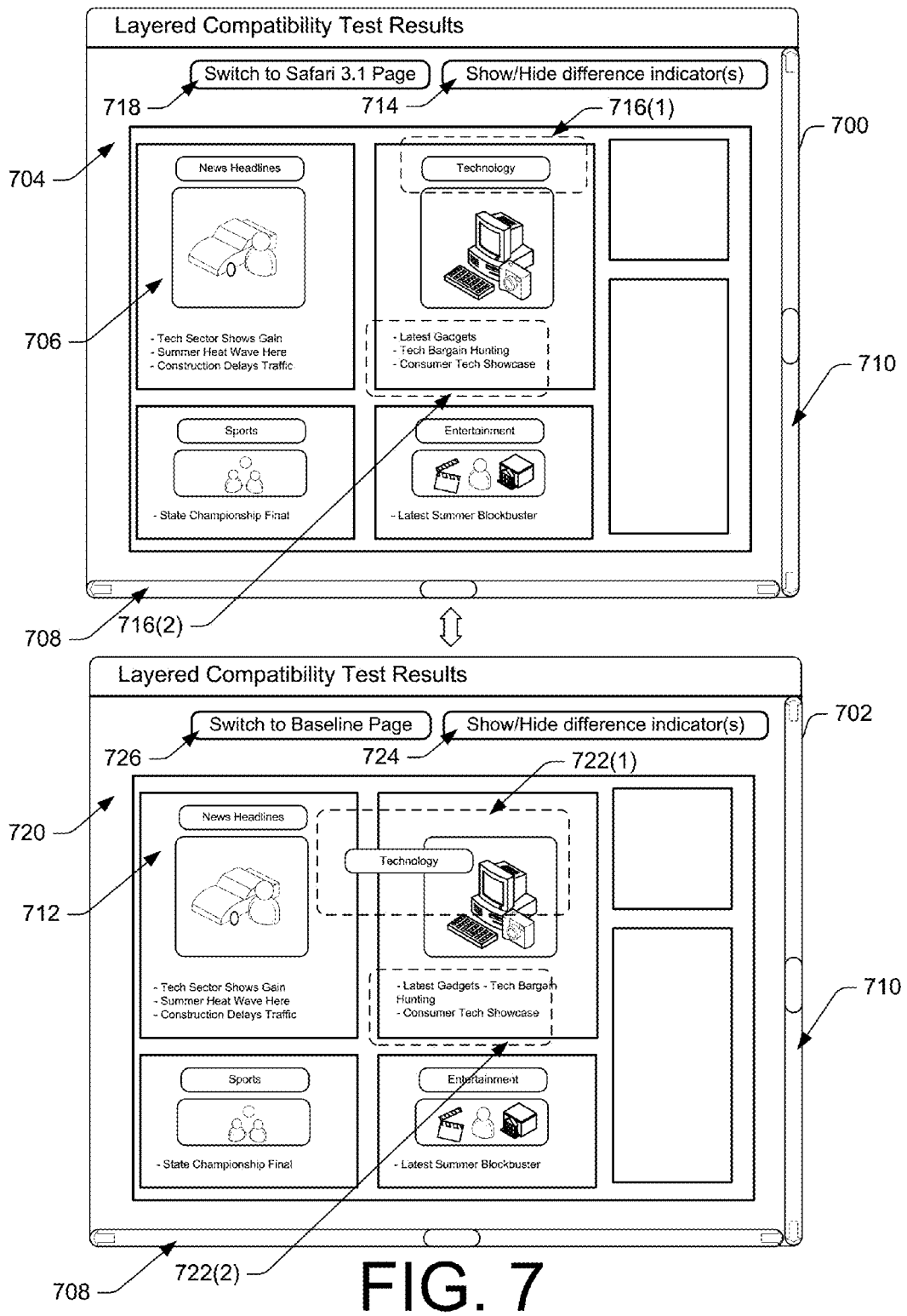
FIG. 7 shows an illustrative user interface page of a browser compatibility checker tool that displays overlaid web page images as generated for multiple web browsers.

FIG. 7 shows illustrative user interface pages 700 and 702 of the browser compatibility checker tool that displays overlaid web page images for visual comparison. The web developer may access the user interface page 700 by selecting (e.g., clicking) an overlay image comparison button, such as the comparison button 524 described in FIG. 5. In various embodiments, the user interface pages 700 and 702 may be generated by the image comparison module 134 of the main server 104.

The use interface page 700 may include a display portion 704 that initially shows a baseline web page image 706. The display portion 704 may also include one or more navigation control (e.g., horizontal scroll bar 708 and/or vertical scroll bar 710) that enables the web developer to scroll and view the baseline web page image 706.

The user interface page 700 may display visual indicators that emphasize the visual difference between the baseline web page image 706 and a rendered web page image 712 that is shown in the user interface page 702. The image comparison module 134 may cause the user interface page 700 to display the visual indicators when the user activates (e.g., clicks) the toggle button 714. In at least one embodiment, the visual indicator may be in the form of superimposed rectangular outlines, such as the visual indicators 716(1) and 716(2), that indicate the visual difference between the baseline web page image 704 and the rendered web page image 712. However, the visual indicators may also take other forms in other embodiments, such as colored highlights, arrow symbols, and/or the like.

As further shown in FIG. 7, an activation (e.g., click) of the toggle button 718 may cause the image comparison module 134 to display the user interface page 702. The user interface page 702 may include a display portion 720. The display portion 720 may display the rendered web page image 712 that is accompanied by visual indicators 722(1) and 722(2). The visual indicators 722(1) and 722(2) may be toggled to appear and disappear by the toggle button 724 in the same manner as the behavior of the visual 718(1) and 718(2). A subsequent activation (e.g., click) of the toggle button 724 may cause the image comparison module 134 to revert to the display of the user interface page 700. Accordingly, the toggle button 724 may enable the web developer to switch back and forth between the baseline web page image 706 and the rendered web page image 712 to identify visual differences between the images.

Illustrative Operations

Figure 8:
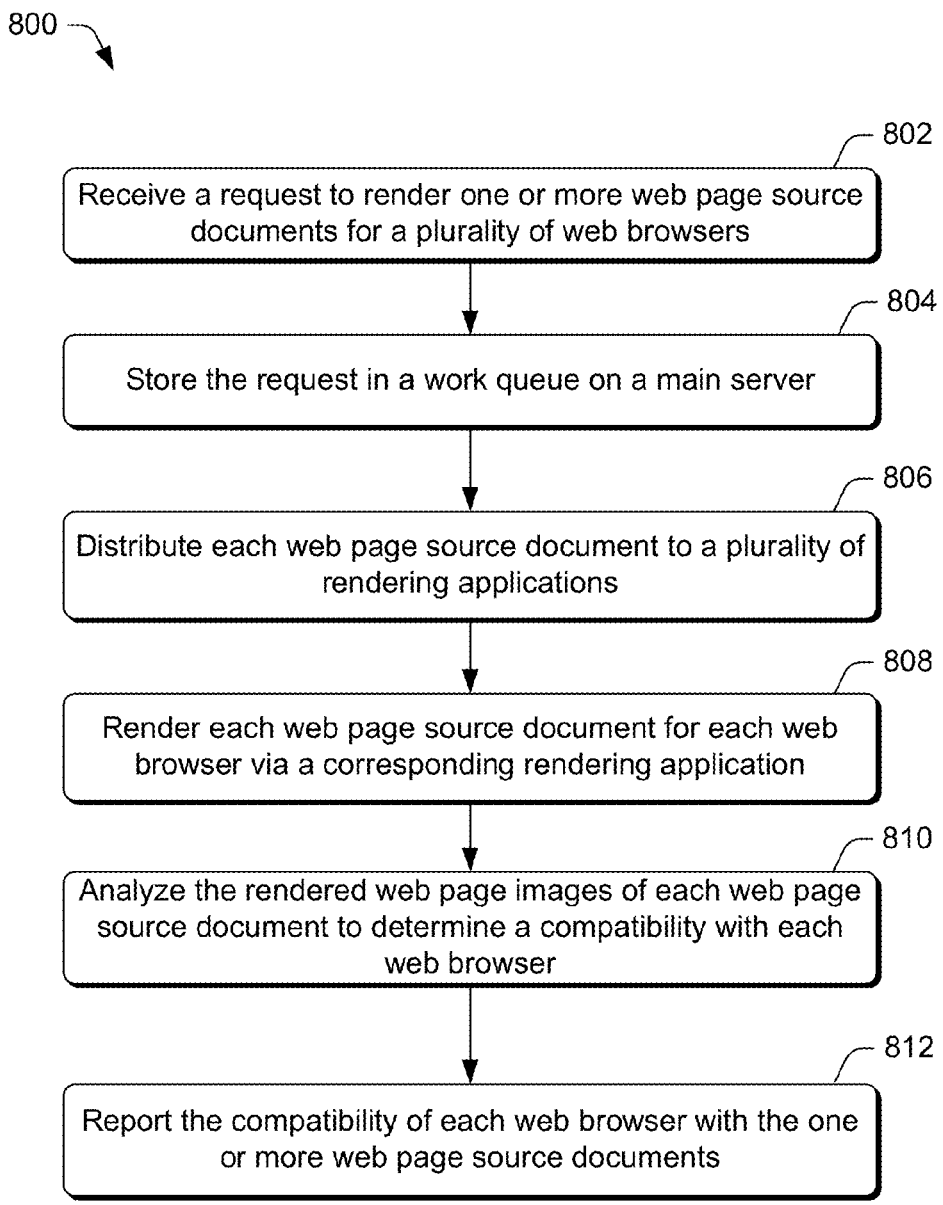
FIG. 8 is a flow diagram of an illustrative process for checking the browser compatibility of the web pages associated with multiple universal resource locators (URLs) using the browser compatibility checker tool.
Figure 9:
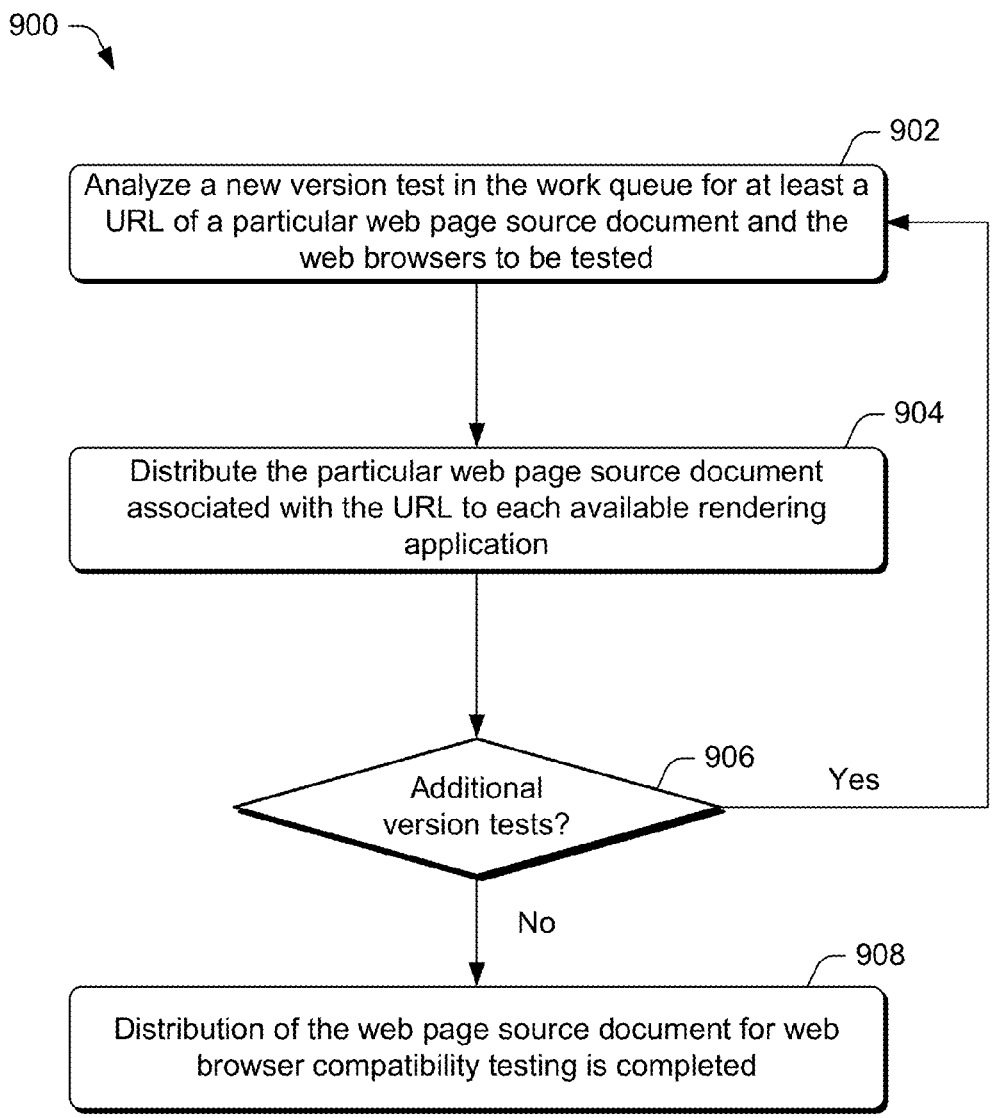
FIG. 9 is a flow diagram of an illustrative process for distributing the web pages associated with multiple universal resource locators (URLs) to a plurality of web page rendering applications.
Figure 10:
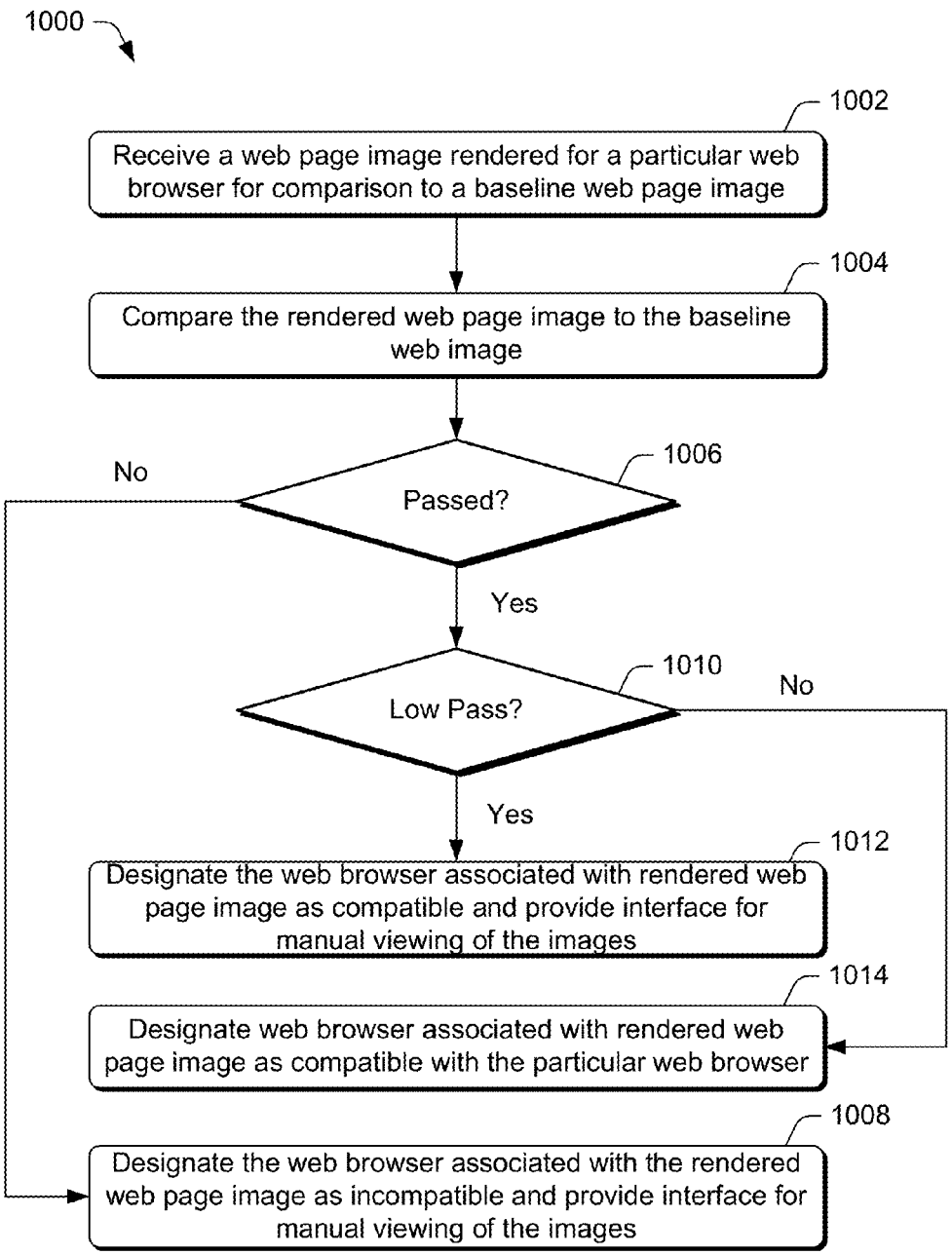
FIG. 10 is a flow diagram of an illustrative process for determining the web browser compatibility with a web page source document via the analysis of web page images generated by the rendering applications of the browser compatibility checker tool.

FIGS. 8-10 show illustrative processes 800-1000 that implement web browser compatibility checking. Each of the processes 800-1000 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800-1000 are described with reference to the computing environment 100 of FIG. 1.

FIG. 8 is a flow diagram of an illustrative process 800 for checking the browser compatibility of the web pages associated with multiple universal resource locators (URLs) using the browser compatibility checker tool.

At block 802, the distribution module 130 of the main server 104 may receive a request to render one or more web page source documents 112 for a plurality of web browsers. The rendering for the web browsers may be for the purpose of testing whether each of the web page source documents is compatible with the one or more web browsers. In other words, each web page source document may be tested to determine whether it can be properly displayed by each web browsers as the web developer intended. In various embodiments, the received request may be in the form of a batch file that include a plurality of universal resource locators (URLs) 110, in which each of the web page source documents 112 corresponds to a different URL 110. The plurality of page source documents in the received request may be accompanied by test information, such as designations of one or more web browsers for which the compatibility test is to be performed, as well as various execution properties for performing the browser compatibility tests. In various embodiments, the execution properties may include one or more cookies, one or more overrides to be applied during the rendering, test description, and/or code portions of each web page source document to be excluded from rendering.

At block 804, the distribution module may store the request in a work queue, such as the work queue 130, of the data storage 136 on the main server 104. In at least one embodiment, the various URLs of the request, as well as the accompanying test information for those URLs, may be stored in the database structure 302 of the work queue 130. In various instances, the database structure 302 may reside on the main server 104 or on the one or more cloud servers 152.

At block 806, the distribution module 130 may distribute each web page source documents to a plurality of rendering applications 150. The rendering applications 150 may reside on one or more rendering servers 106, each rendering application 150 may correspond to a particular web browser version. The distribution module 130 may parse any unit tests 314 and/or test suites 324 in the request into a plurality of version tests 306. Accordingly, the distribution module 130 may distribute each version test 306 to a particular rendering application 150 responsible for generating a corresponding rendered web page image.

At block 808, each rendering application 150 receiving a version test may render a web page image based on the web page source document referred to in the version test. In various embodiments, each rendering application 150 may access the referred to web page source document via the URL that is included in the version test. In some embodiments, the distribution module may give each rendering application a predetermined amount of time (e.g., 20 seconds) to complete the rendering of the web page image following distribution. If the rendering fails to complete (e.g., no web page image was return) in the predetermined amount of time, the distribution module 140 may cause the image comparison module 134 to automatically assign a "fail" status to the web browser version corresponding to the failed rendering application 150. In other words, such a "fail" status may indicate that the web browser version is incompatible with the web page source document in the version test.

Following rendering of the web page images, the distribution module 130 stored the rendered web images according to the original organizations of any unit tests or tests suites present in the request. In at least one embodiment, the distribution module 130 may use the directory structure 304 to store the rendered web page images. In various instances, the directory structure 304 may reside on the main server 104 or on the one or more cloud servers 152.

At block 810, the image comparison module 134 of the main server 104 may analyze the rendered web page images for each web page source document. Such analysis may determine whether each web page source document is compatible with the web browsers that correspond to the rendered web page images. In various embodiments, based on the comparison of each rendered web page image with a baseline web page image, the image comparison module 134 may assign a "pass" status, a "low pass" status, or a "fail" status to each web browser for which browser compatibility testing was performed.

At block 812, the main server 104 may report the compatibility of each tested web browser with the one or more web page source documents. In various embodiments, the distribution module 130 may notify a web developer that a particular requested browser compatibility test is complete. Subsequently, the web developer may use the user interface pages generated by the image comparison module 134 to view the results of the browser compatibility tests for the one or more web page source documents.

FIG. 9 is a flow diagram of an illustrative process 900 for distributing the web page coding of multiple universal resource locators (URLs) to a plurality of web page rendering applications. The illustrative process 900 may further describe block 806 of the process 800.

At block 902, the distribution module 130 may analyze a new version test in the work queue 138 for at least a URL 110 of a particular web page source document 110, the designated web browsers for which compatibility with the particular web page source document is to be tested, as well any execution properties to be implemented during the compatibility test of the web browsers.

At block 904, the distribution module 130 may distribute the particular web page source document to each of the rendering applications that perform compatibility testing for the corresponding web browsers. In various embodiments, the distribution module may distribute the particular web page source document to a rendering application when the rendering application becomes available (e.g., not processing another version test). In some embodiments, the distribution module 130 may have the ability to instantiate or terminate new or existing instances of various rendering applications 150 on the one or more rendering servers 106, depending on version test demand for each rendering application.

At decision block 906, the distribution module 130 may determine whether additional versions tests are to be performed as part of the same compatibility testing. For example, the distribution module 130 may have generated multiple version tests from a unit test (e.g., unit test 314) or a test suite (e.g., test suite 324). Accordingly, if the distribution module 130 determines that additional version tests are to be performed ("yes" at decision block 906), the process 900 may loop back to decision block 902. However, if the distribution module 130 determines that no additional version tests are to be performed ("no" at decision block 906), the process may proceed to block 908. At block 908, the distribution module 130 may determine that the distribution of the web page source document for web browser compatibility testing is completed.

FIG. 10 is a flow diagram of an illustrative process 1000 for determining the web browser compatibility with a web page source document via the analysis of web page images generated by the rendering application of the browser compatibility checker tool. The illustrative process 1000 may further describe block 810 of the process 800.

At block 1002, the image comparison module 134 may receive a web page image that is rendered for a particular web browser based on a specific web page source document 112. In some embodiments, the received web page image may be missing one or more visual features as the one or more corresponding code portions of the underlying web page source document may have been excluded from being rendered.

At block 1004, the image comparison module 134 may compare the rendered web page image to the baseline web page image for visual difference. In various embodiments, the image comparison score may generate a numerical difference score for the rendered web page image that represents this visual difference. The image comparison module 134 may generate numerical difference scores so that a lower score represents smaller visual difference between two images, and a higher score represents more visual difference between two images.

At decision block 1006, the image comparison module 134 may determine based on the numerical difference score whether the rendered web page image is within a passing range, in which the passing range may also encompass a low passing range. Thus, if the image comparison module 134 determines that the numerical difference score is not within the passing range ("no" at block 1006), the process 1000 may proceed to block 1008. At block 1008, the image comparison module 134 may designate the web browser associated with the rendered web page image as incompatible with the specific web page source document. In at least one embodiment, the image comparison module 134 may provide interfaces (e.g., side-by-side and/or overlay comparison buttons) for the web developer to view the visual differences between the images. However, if the image comparison module 134 determines that the numerical difference score is within the passing range ("yes" at decision block 1006), the process 1000 may proceed to decision block 1010.

At decision block 1010, the image comparison module 134 may determine based on the numerical difference score whether the rendered web page image is in the "low pass" range. If the image comparison module 134 determines that the rendered web page image is in the "low pass" range ("yes" at decision block 1010), the process 1000 may proceed to block 1012.

At block 1012, the image comparison module 134 may designate the web browser associated with the rendered web page image as compatible with the specific web page source document. Nevertheless, in at least one embodiment, the image comparison module 134 may provide interfaces (e.g., side-by-side and/or overlay comparison buttons) for the web developer to view the visual differences between the images.

However, if the image comparison module 134 determines that the rendered web page image has a true pass, that is, there is no visual difference between the rendered web page image and the baseline web page image ("no" at decision block 1010), the process 1000 may proceed to block 1014. At block 1014, the image comparison module 134 may designate the web browser associated with the rendered web page image as compatible with the specific web page source document.

In summary, the browser compatibility checker tool in accordance with the various embodiments described above may assist web content developers in meeting testing and quality objectives in a more efficient manner, shorten web page development cycles. This tool may also reduce the time burden associated with browser compatibility testing of web pages.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method, comprising: under control of one or more computing systems configured with executable instructions,
   receiving, at a distribution server, a request for one or more rendering applications to render a web page source document for compatibility testing with a plurality of different web browsers;
   receiving a designation of the web page source document with position and dimension data, which identifies one or more code portions of the web pace source document, to suspend, during the compatibility testing, rendering of the one or more code portions by the one or more rendering applications, the one or more code portions including code for rendering of dynamic web content;
   distributing, by the distribution server, the web page source document with the position and dimension data to the one or more rendering applications on at least one rendering server, the one or more rendering applications to render the web page source document for the plurality of different web browsers; and
   receiving at least one rendered web page image, corresponding to a particular web browser, generated by a corresponding rendering application from the web page source document.

2. The computer implemented method of claim 1, further comprising:
  analyzing the at least one rendered web page image to determine an amount of visual difference between the at least one rendered web page image and a baseline web page image;
  determining that a first web browser corresponding to a first rendered web page image is compatible with the web page source document based on ascertaining that an amount of visual difference between the first rendered web page image and the baseline web page image is less than a predetermined visual difference threshold;
  determining that a second web browser corresponding to a second rendered web page image is compatible with the web page source document based on ascertaining that there is no visual difference between the second rendered web page image and the baseline web page image; and
  determining that a third web browser corresponding to a third rendered web page image is incompatible with the web page source document based on ascertaining that an amount of visual difference between the third rendered web page image and the baseline web page image is greater than the predetermined visual difference threshold.

3. The computer implemented method of claim 2, further comprising determining that at least one of the plurality of different web browsers is incompatible with the web page source document it based on ascertaining that a corresponding rendering application fails to render a web page image within a predetermined time period.

4. The computer implemented method of claim 2, further comprising sending a completion notification when the one or more rendering applications complete a rendering of one or more of the first rendered web gage image, the second rendered web gage image, or the third rendered web page image or when analysis of one or more of the first rendered web page image, the second rendered web gage image, or the third rendered web page image is complete.

5. The computer implemented method of claim 2, further comprising providing at least one of a side-by-side comparison or an overlay comparison of the at least one rendered web page image with the baseline web page image.

6. The computer implemented method of claim 5, wherein at least one of the side-by-side comparison or the overlay comparison include one or more visual indicators that highlight one or more visual differences between the at least one rendered web page image and the baseline web page image.

7. The computer implemented method of claim 1, wherein the request includes a uniform resource locator (URL) that links to the web page source document.

8. The computer implemented method of claim 1, wherein the receiving the at least one rendered web page image includes:
  receiving an authentication credential at the distribution server;
  comparing the authentication credential to a stored authentication credential associated with the at least one rendered web page image; and
  acquiring the at least one rendered web page image from a cloud server that stores the at least one rendered web page image generated by the one or more rendering applications when the authentication credential matches the stored authentication credential.

9. The computer implemented method of claim 1, wherein the request includes execution properties for the rendering of the one or more code portions, and the execution properties include at least one of a test description, a cookie to be used by the one or more rendering applications, or an override to be used by each rendering application.

10. The computer implemented method of claim 9, wherein the cookie is to activate a web page feature that is coded into the web page source document.

11. The computer implemented method of claim 1, wherein the distributing includes distributing the web page source document to the one or more rendering applications, the one or more rendering applications residing on different rendering servers.

12. The computer implemented method of claim 1, wherein the distributing includes determining an availability of a particular rendering application, and distributing the web page source document to the particular rendering application when the particular rendering application is available.

13. The computer implemented method of claim 1, wherein the distributing includes distributing the web page source document by providing a universal resource locator (URL) of the web page source document to the one or more rendering applications.

14. A computer implemented method, comprising:
  under control of one or more computing systems configured with executable instructions,
  receiving a request to render a web page source document for compatibility testing with a plurality of different web browsers;
  distributing the web page source document to one or more rendering applications to render the web page source document for one or more of the web browsers, wherein the distributing includes excluding a code portion of the web page source document from being rendered;
  receiving one or more rendered web page images corresponding to the plurality of different web browsers;
  analyzing the one or more rendered web page images corresponding to one or more of the web browsers to determine an amount of visual difference between the one or more rendered web page images and a baseline web page image;
  generating a visual difference score for the one or more rendered web page images that represents the amount of visual difference between a corresponding rendered web page image and the baseline web page image;
  determining that a web browser corresponding to a first rendered web page image of the web page source document is incompatible with the web page source document in response to ascertaining that a visual difference score for the first rendered web page image with respect to the baseline web page image is greater than a predetermined visual difference score threshold; and
  determining that a web browser corresponding to a second rendered web page image of the web page source document is compatible with the web page source document in response to ascertaining that a visual difference score for the second rendered web page image with respect to the baseline web page image is within the predetermined visual difference score threshold range.

15. The computer implemented method of claim 14, wherein the receiving the one or more rendered web page images includes:
  receiving an authentication credential at the distribution server;
  comparing the authentication credential to a stored authentication credential associated with the one or more rendered web page images; and
  acquiring the one or more rendered web page images from a cloud server that stores the rendered web page images generated by the one or more rendering applications when the authentication credential matches the stored authentication credential.

16. The computer implemented method of claim 14, further comprising determining that a third web browser corresponding to a rendered web page image of a third web page source document is compatible with the web page source document in response to ascertaining that a visual difference score for the rendered web page image of the third web page source document with respect to the baseline web page image is less than the predetermined visual difference score threshold range.

17. The computer implemented method of claim 14, further comprising determining that a third web browser corresponding to a third web page source document is incompatible with the third web page source document in response to determining that a corresponding rendering application fails to render a web page image for the third web page source document within a predetermined time period.

18. The computer implemented method of claim 11, further comprising providing at least one of a side-by-side comparison or an overlay comparison of a rendered web page image with the baseline web page image.

19. The computer implemented method of claim 18, wherein one or more of the comparisons include one or more visual indicators that highlight one or more visual differences between the rendered web page image and the baseline web page image.

20. The computer implemented method of claim 14, wherein the baseline web page image is a model web page image or one of the web page images rendered by the one or more rendering applications.

21. The computer implemented method of claim 14, wherein the request includes execution properties for the rendering of the web page source documents, and wherein the execution properties include at least one of a test description, a cookie to be used by each rendering application, a code portion of each web page source document to exclude, or an override to be used by each rendering application.

22. The computer implemented method of claim 14, wherein the request is in a form of a batch file that includes universal resource locators (URLs) that correspond to the multiple web page source documents.

23. The computer implemented method of claim 14, wherein the distributing includes determining an availability of a particular rendering application, and distributing the web page source document to the particular rendering application when the particular rendering application is available.

24. One or more non-transitory computer readable media storing computer-executable instructions that, when executed, cause one or more processors to perform acts comprising:
receiving a request for one or more rendering applications to render a web page source document for compatibility testing with a plurality of different web browsers;
parsing the request into a plurality of version tests corresponding to the plurality of different web browsers;
designating the web page source document with position and dimension data corresponding to one or more code portions of the web page source document for preventing the one or more rendering applications from rendering the one or more code portions during the compatibility testing;
receiving rendered web page images from the one or more rendering applications after the one or more rendering applications have rendered at least some of the plurality of version tests, the rendered web page images corresponding to different web browsers of the plurality of different web browsers; and
determining an amount of visual difference between particular ones of of the rendered web page images and a baseline web page image.

25. The one or more non-transitory computer readable media of claim 24, further comprising instructions that when executed, cause the one or more processors to perform an act of designating a web browser corresponding to a first rendered web page image of the web page source document as incompatible with the web page source document based on determining that the amount of visual difference between the first rendered web page image and the baseline web page image is greater than a predetermined visual difference threshold.

26. The one or more non-transitory computer readable media of claim 24, further comprising instructions that when executed, cause the one or more processors to perform an act of at least one of providing a side-by-side comparison or an overlay comparison of a rendered web page image with the baseline web page image.

27. The one or more non-transitory computer readable media of claim 24, further comprising instructions that when executed, cause the one or more processors to perform an act of designating a web browser corresponding to a first rendered web page image of the web page source document as compatible with the web page source document based on determining that an amount of visual difference between the first rendered web page image and the baseline web page image is less than a predetermined visual difference threshold.

28. The one or more non-transitory computer readable media of claim 24, further comprising instructions that when executed, cause the one or more processors to perform an act of designating a web browser corresponding to a first rendered web page image of the web page source document as being compatible with the web page source document based on determining that there is no visual difference between the first rendered web page image and the baseline web page image.

29. The one or more non-transitory computer readable media of claim 24, further comprising instructions that when executed, cause the one or more processors to perform an act of designating a web browser as being incompatible with the web page source document based on determining that at least one corresponding web page image of is not rendered within a predetermined time period.

30. The one or more non-transitory computer readable media of claim 24, wherein the receiving the rendered web page images includes:
receiving an authentication credential at a distribution server;
comparing the authentication credential to a stored authentication credential associated with the rendered web page images; and
acquiring the rendered web page images from a cloud server that stores the rendered web page images based on a determination that the authentication credential matches the stored authentication credential.

31. The one or more non-transitory computer readable media of claim 24, wherein the request includes a unit test that specifies a particular web page source document for rendering by the one or more rendering applications.

32. The one or more non-transitory computer readable media of claim 24, wherein the request includes a test suite that specifies multiple web page source documents for rendering by the one or more rendering applications.

33. The one or more non-transitory computer readable media of claim 24, wherein the request includes the execution properties for the rendering of the web page source document, and the execution properties further include at least one of a test description, an identification of a particular code portion of the web page source document to exclude, a cookie to be used by each rendering application, or an override to be used by each rendering application.

34. The one or more non-transitory computer readable media of claim 33, wherein the execution properties include the cookie, and wherein the cookie is to activate a web page feature that is coded into the web page source document.

35. A server, comprising:
a processor; and
memory storing modules executable by the processor, the modules comprising:
   a distribution module that distributes a web page source document, for compatibility testing with a plurality of different web browsers, to one or more rendering applications on at least one rendering server, the one or more rendering applications to render the web page source document for a plurality of different web browsers, the distribution module further determines that a particular web browser is incompatible with the web page source document in response to ascertaining that the rendering application fails to render a web page image within a predetermined time period;
   an image comparison module that analyzes at least one of the rendered web page images for one or more visual differences with a baseline web page image to generate a visual difference score, wherein the image comparison module is configured to perform one or more of the operations comprising:
      determining that a web browser corresponding to a first rendered web page image is compatible with the web page source document in response to ascertaining that a visual difference score of the first rendered web page image is less than to a visual difference score threshold; and
      determining that a web browser corresponding to a second rendered web page image is incompatible with the web page source document in response to ascertaining that a visual difference score of the second rendered web page image is greater than the visual different score threshold.

36. The server of claim 35, wherein the distribution module is to further:
   receive an authentication credential from a user of the request;
   compare the authentication credential to a stored authentication credential associated with the rendered web page images; and
   receive the rendered web page images from a cloud server that stores the rendered web page images generated by the plurality of rendering applications when the authentication credential matches the stored authentication credential.

37. The server of claim 35, wherein a portion of the web page source document is excluded from being rendered by each rendering application.

38. The server of claim 35, wherein the baseline web image is a model web page image or one of the web page images rendered by the plurality of rendering applications.

39. The server of claim 35, wherein the image comparison module is to further provide a side-by-side comparison or an overlay comparison of each rendered web page image with the baseline web page image.

40. The server of claim 39, wherein one or more of the comparisons include one or more visual indicators that highlight the one or more visual differences between the rendered web page image and the baseline web page image.

* * * * *